United States Patent
Namiki et al.

(10) Patent No.: US 10,498,154 B2
(45) Date of Patent: Dec. 3, 2019

(54) ELECTRIC POWER SYSTEM

(71) Applicant: Honda Motor Co., Ltd., Tokyo (JP)

(72) Inventors: Shigeru Namiki, Saitama (JP); Yuki Koizumi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/048,370

(22) Filed: Jul. 30, 2018

(65) Prior Publication Data
US 2019/0044361 A1 Feb. 7, 2019

(30) Foreign Application Priority Data
Aug. 3, 2017 (JP) .................................. 2017-150832

(51) Int. Cl.
*H02J 7/00* (2006.01)
*B60R 16/033* (2006.01)

(52) U.S. Cl.
CPC ........... *H02J 7/0068* (2013.01); *B60R 16/033* (2013.01)

(58) Field of Classification Search
CPC ............... H02J 7/0031; H02J 2007/004; H02J 2007/0037; Y02E 60/12; H01M 10/48
See application file for complete search history.

(56) References Cited

U.S. PATENT DOCUMENTS

| | | | | |
|---|---|---|---|---|
| 2009/0243556 A1* | 10/2009 | Lu | .......................... | G01R 31/367 320/162 |
| 2009/0266631 A1* | 10/2009 | Kikuchi | ................ | H01M 10/44 180/65.265 |
| 2011/0109273 A1* | 5/2011 | Tamezane | ............. | H02J 7/0077 320/132 |
| 2011/0156644 A1* | 6/2011 | Arai | ....................... | B60L 3/0046 320/109 |
| 2011/0236751 A1* | 9/2011 | Amiruddin | ......... | H01M 4/0447 429/188 |
| 2015/0054466 A1* | 2/2015 | Kinomura | ............... | B60L 53/68 320/134 |
| 2016/0049821 A1* | 2/2016 | Aridome | ............... | H02J 7/0073 320/128 |

FOREIGN PATENT DOCUMENTS

| | | |
|---|---|---|
| JP | 2010088206 | 4/2010 |
| JP | 2016028198 | 2/2016 |

OTHER PUBLICATIONS

"Office Action of Japan Counterpart Application," dated May 14, 2019, with English translation thereof, p. 1-p. 4.

* cited by examiner

*Primary Examiner* — Arun C Williams
(74) *Attorney, Agent, or Firm* — JCIPRNET

(57) ABSTRACT

Provided is an electric power system, including: a battery, connected to an ACG and an electric load, and capable of charge by electric power generated by the ACG and discharge to the electric load; and an ECU, setting an SOC target value of the battery for each driving cycle, and controlling the charge and discharge of the battery so that the SOC of the battery becomes the SOC target value. The ECU sets the SOC target value in a normal mode when a starting SOC value in the most recent past driving cycle is lower than an ending SOC value, and sets the SOC target value in a degeneration suppression mode when the starting SOC value is greater than the ending SOC value continuously for two most recent driving cycles.

19 Claims, 3 Drawing Sheets

ELECTRIC POWER SYSTEM

CROSS-REFERENCE TO RELATED APPLICATION

This application claims the priority of Japan patent application serial no. 2017-150832, filed on Aug. 3, 2017. The entirety of the above-mentioned patent application is hereby incorporated by reference herein and made a part of this specification.

BACKGROUND

Technical Field

The disclosure relates to an electric power system.

Description of Related Art

A battery is mounted on a vehicle to supply electric power to vehicle auxiliary machines such as air conditioners, lights, and navigation systems. Besides, a power generator is mounted on the vehicle, and power of the engine for example can be utilized to drive the power generator to charge the battery properly.

In patent literature 1 (Japanese Laid-open Publication No. 2016-28198), a technology is disclosed to set a usable SOC (State Of Charge) range for a charging rate of the battery (a ratio represented by percentage showing the ratio of a remaining capacity of the battery with respect to a full charge capacity, also referred to as "SOC", hereinafter) in order to prolong a service life of such a battery. In the technology of patent literature 1, when the SOC of the battery is below a lower limit of the aforementioned SOC range, power of the engine is increased to make the SOC fall in the SOC range, and when the SOC is above an upper limit of the SOC scope, discharge of the battery is urged to make the SOC fall in the SOC scope. According to the technology of patent literature 1, the SOC of the battery can be maintained approximately within the SOC scope.

However, conventionally, it has not been fully discussed on what value should be set for a target charging rate, which is the target of a charging rate of the battery, within the SOC range.

SUMMARY

The disclosure provides an electric power system capable of setting the target charging rate to a proper value according to the user's inclination of actual usage of the battery.

The electric power system comprises a battery, connected to an electric device; a target value setting part, setting target values of battery parameters that are related to properties of the battery; and a charge-discharge control part, controlling at least one of charge and discharge of the battery so that values of the battery parameters become the target values during at least a portion of an operation cycle from an operation start to an operation stop of a predetermined device having the electric device. The target value setting part sets the target value based on an operation start parameter value and an operation end parameter value. The operation start parameter value is a value of a battery parameter at the start of a past operation cycle, and the operation end parameter value is a value of the battery parameter at the end of the same operation cycle.

DESCRIPTION OF THE EMBODIMENTS

In the following part, an embodiment of the disclosure is described with reference to drawings.

Figure 1:
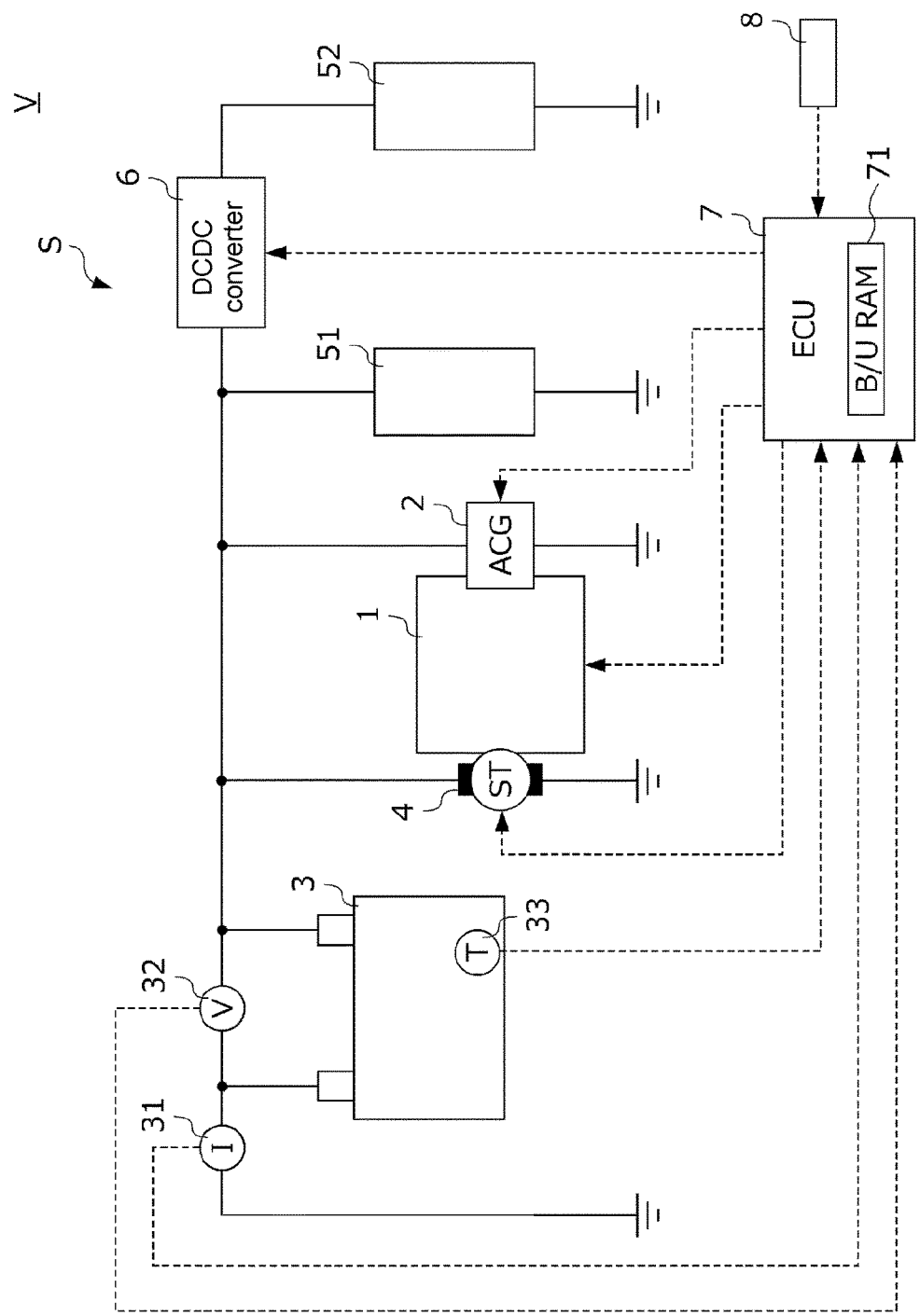
FIG. 1 is a diagram showing configuration of an electric power system and a vehicle where the electric power system is mounted thereon according to an embodiment of the disclosure.

FIG. 1 is a diagram showing structures of an electric power system S of this embodiment and a vehicle V on which the electric power system S is mounted.

The electric power system S comprises an alternator 2 (referred to as "ACG 2" hereinafter), utilizing a power of an internal-combustion engine 1 (referred to as "engine 1" hereinafter) that is a power-generating source of the vehicle V to generate electric power; a battery 3, capable of being charged by an electric power generated by the ACG 2; a starter 4, starting the engine 1 using the electric power supplied from the battery 3; a first electric load 51, capable of using the electric power supplied from the battery 3 to operate; a DCDC converter 6, increasing or decreasing a voltage of the direct-current electric power of the battery 3; a second electric load 52, connected to the battery 3 via the DCDC converter 6; an ECU7, which is an electronic control module that controls the above elements; and an ignition switch 8, operated when a driver starts or stops the vehicle V, i.e., when operation of vehicle-mounted devices such as the engine 1, the ACG 2, the starter 4, the electric load 51, 52, and the DCDC converter 6 which are necessary to run the vehicle V is started or stopped.

The ACG 2 is connected to a crankshaft of the engine 1 via a belt that is not shown and generates electric power by being rotation-driven by the crankshaft. The ACG 2 comprises a regulator or a rotor coil, etc. The ECU 7 adjusts a current flowing in the rotor coil by controlling a switch of the regulator to be turned ON or OFF, and adjusts the electric power generated by the ACG 2. In addition, an output voltage of the ACG 2 is set higher than the voltage of the battery 3 so that the battery 3 can be charged by the electric power generated by the ACG 2.

The ECU 7 controls at least one of the charge and discharge of the battery 3 during at least a portion of a driving cycle from a moment when the ignition switch 8 is turned on until a moment when the ignition switch 8 is turned off. More specifically, the ECU 7 adjusts the electric power generated by the ACG 2 during at least a portion of the driving cycle so that the SOC value, which is one of the battery parameters related to the properties of the battery 3, becomes the SOC target value that is set based on processes that are described below with reference to FIG. 2.

The battery 3 is a secondary battery capable of discharge that converts chemical energy to electric energy as well as charge that converts electric energy to chemical energy. In this embodiment, a lead battery using lead in electrodes is used to describe the battery 3. In addition, the battery 3 has a property that the battery 3 degenerates for each use. Particularly, the battery 3, which is a lead battery, has a property that the battery 3 degenerates quickly when being maintained at a state of low SOC. For this reason, the SOC can be maintained at a great value as far as possible to delay the degeneration process of the battery 3.

As mentioned above, in this embodiment, the lead battery is used to describe the battery 3, but the disclosure is not limited to this. A so-called lithium ion battery that performs charge and discharge by movement of the lithium ions between the electrodes may also be used as the battery 3.

A plurality of sensors 31, 32, 33 are arranged on the battery 3 to grasp the charging state of the battery 3 in the ECU 7. The battery current sensor 31 detects the current flowing in the battery 3 and transmits a signal corresponding to the detection value to the ECU 7. The battery voltage sensor 32 detects a voltage among terminals between positive and negative electrodes of the battery 3 and transmits a signal corresponding to the detection value to the ECU 7. The battery temperature sensor 33 detects a temperature of the battery 3 and transmits a signal corresponding to the detection value to the ECU 7.

The ECU 7 uses the detection signals from the sensors 31-33 to calculate an estimation value of the SOC of the battery 3 based on an existing estimation algorithm. A so-called OCV-SOC method that estimates the SOC based on a correlation relationship between an open circuit voltage (OCV) and the SOC of the battery 3, or a coulomb count method that estimates the SOC by accumulating a current flowing in the battery 3, etc. are used as the existing estimation algorithm.

The starter 4 is a cell motor that starts the engine 1 by the electric power supplied from the battery 3. When the driver turns the ignition switch 8 on to start the vehicle V or restarts the engine 1 after an idling stop control (not shown) is implemented to stop the engine 1, the ECU 7 supplies the electric power from the battery 3 to the starter 4 and starts the engine 1.

The electric loads 51, 52 comprise various electronic machines mounted on the vehicle V, for example, lights, air conditioners, navigation systems, electric power steering, and acoustic equipment.

The ECU 7 comprises an I/O interface sensor, a RAM or ROM, a CPU and a drive circuit. The I/O interface sensor performs A/D conversion to the detection signal. The RAM or ROM stores various control programs or data, etc. The CPU executes various arithmetic processes accordingly to the above programs. The drive circuit drives the engine 1, the ACG 2, the starter 4, and the DCDC converter 6, etc. according to the arithmetic process results of the CPU.

Besides, the ECU 7 comprises a backup RAM 71 serving as a storage media where information related to the SOC of the battery 3 in a past driving cycle is stored. When the ignition switch 8 is turned on, the ECU 7 estimates the SOC of the battery 3 accordingly, and stores the estimation value of the SOC in the backup RAM 71 as a starting SOC. Moreover, when the ignition switch 8 is turned off, the ECU 7 estimates the SOC of the battery 3 accordingly, and stores the estimation value of the SOC in the backup RAM 71 as an ending SOC. As described above, through most recent past N times (N is at least above 2) of driving cycle, the starting SOC value and the ending SOC value for one driving cycle are stored in the backup RAM 71.

Figure 2:
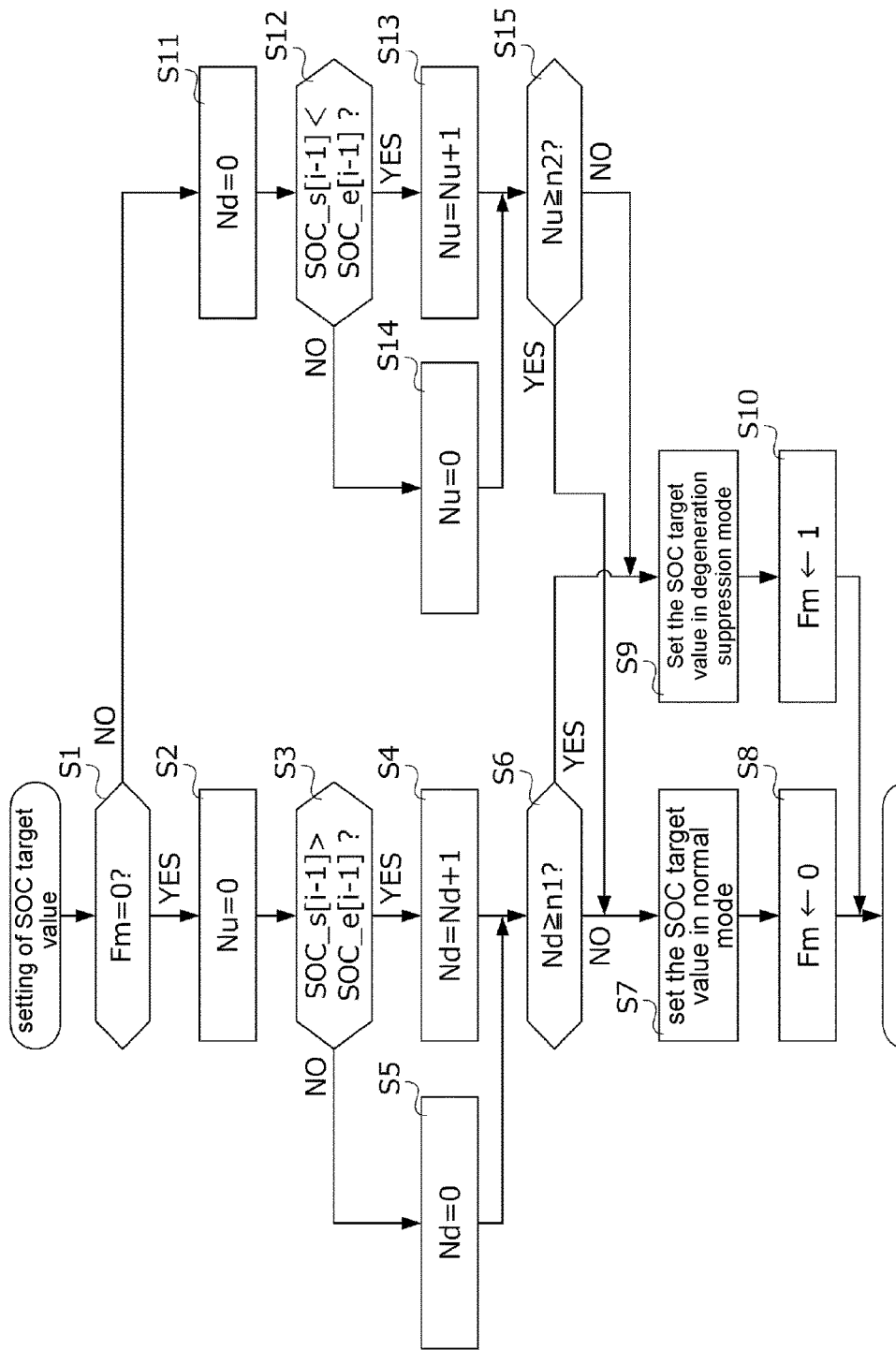
FIG. 2 is a flow chart showing processes of setting a SOC target value of a present driving cycle.

FIG. 2 is a flow chart showing processes of setting the SOC target value in a present driving cycle. The process in FIG. 2 is implemented in the ECU 7 in accordance with the ignition switch 8 being turned on. As shown in FIG. 2, in the ECU 7, the SOC target value can be set in two types of modes which are a normal mode (see S7) and a degeneration suppression mode (see S9).

In the normal mode, as described below in detail, the SOC target value in the present driving cycle is set within a predetermined control target range (for example, between a target upper limit U [%] and a target lower limit D [%]) so that unnecessary fuel consumption for driving the ACG 2 is suppressed. Besides, in the degeneration suppression mode, as described below in detail, the SOC target value in the present driving cycle is set to a value greater than the setting value in the normal mode so that the degeneration of the battery 3 is suppressed.

First, in S1, the ECU 7 determines whether a value of a mode flag Fm is 0. The mode flag Fm shows a type of a driving mode adopted when setting the SOC target value in a previous driving cycle. When the SOC target value is determined in the normal mode in the previous driving cycle, the value of the mode flag Fm is set to 0 (see S8). Besides, when the SOC target value is determined in the degeneration suppression mode in the previous driving cycle, the value of the mode flag Fm is set to 1 (see S10).

The ECU 7 proceeds to S2 when the determination of S1 is YES, i.e., when the SOC target value is set in the normal mode in the previous driving cycle, and proceeds to S11 when the determination of S1 is NO, i.e., when the SOC target value is set in the degeneration suppression mode in the previous driving cycle.

In S2, the ECU 7 resets an increasing counter Nu (Nu=0) described below and proceeds to S3. In S3, the ECU 7 sets the present driving cycle as an $i^{th}$ driving cycle, reads the starting SOC value (referred to as "SOC_s [i−1]" hereinafter) and the ending SOC value (referred to as "SOC_e [i−1]" hereinafter) of the previous (i.e., i−$1^{th}$) driving cycle from the backup RAM 71, and determines whether the SOC_s [i−1] is greater than the SOC_e [i−1] (SOC_s [i−1]>SOC_e [i−1]). That is, in S3, the ECU 7 determines whether the SOC at the end is lower than at the start in the previous driving cycle.

The ECU 7 proceeds to S4 and counts up a decreasing counter Nd (Nd=Nd+1) when the determination in S3 is YES, i.e., when the SOC of the battery 3 is in a decreasing tendency, and proceeds to S5 and resets the decreasing counter Nd to 0 (Nd=0) when the determination of S3 is NO, i.e., when the SOC of the battery 3 is in an increasing tendency.

In S6, the ECU 7 determines whether the decreasing counter Nd updated as mentioned above is greater than a predetermined first number of times of setting n1. Here, the first number of times of setting n1 is any integer number equal to or larger than 2. Below, the first number of times of setting n1 is set to 2.

When the determination of S6 is NO, the ECU 7 proceeds to S7 and sets the SOC target value in the normal mode. In the normal mode, the ECU 7 sets the SOC target value within the abovementioned control target range. More specifically, the ECU 7 obtains the starting SOC value (referred to as "SOC_s [i]" hereinafter) of the present driving cycle, and sets the SOC_s [i] as the SOC target value of the present driving cycle when the SOC_s [i] is within the control target range. In addition, the ECU 7 sets the target upper limit U as the SOC target value of the present driving cycle when the SOC_s [i] is above the target upper limit U. Besides, the ECU 7 sets the target lower limit D as the SOC target value of the present driving cycle when the SOC_s [i] is below the target lower limit D. In S8, the ECU 7 sets the value of the mode flag Fm to 0 to show that the SOC target value of the present driving cycle is set in the normal mode, and ends the process in FIG. 2.

Besides, when the determination of S6 is YES, i.e., when the SOC of the battery 3 is continuously in the decreasing tendency through the most recent past driving cycles of the first number of times of setting n1, the ECU 7 proceeds to S9 and sets the SOC target value in the degeneration suppression mode. As described above, when a lead battery is used as the battery 3, the SOC can be maintained at a great value as far as possible to delay the degeneration process of the battery 3. Therefore, in the degeneration suppression mode, to suppress a further decrease in the SOC of the battery 3, and delay the degeneration process of the battery 3, the ECU 7 sets a largest target upper limit U in the control target range as the SOC target value of the present driving cycle. In S10, the ECU 7 sets the value of the mode flag Fm to 1 to show that the SOC target value of the present driving cycle is set in the degeneration suppression mode, and ends the process in FIG. 2.

In S11, the ECU 7 resets the abovementioned decreasing counter Nd (Nd=0) and proceeds to S12. In S12, the ECU 7 sets the present driving cycle to the $i^{th}$ driving cycle, reads SOC_s [i−1] and SOC_e [i−1] from the backup RAM 71 and determines whether the SOC_e [i−1] is greater than the SOC_s [i−1] (SOC_e [i−1]>SOC_s [i−1]). That is, in S12, the ECU 7 determines whether the SOC at the end is greater than at the start in the previous driving cycle in which the SOC target value is set in the degeneration suppression mode.

The ECU 7 proceeds to S13 and counts the increasing counter Nu (Nu=Nu+1) when the determination in S12 is YES, i.e., when the SOC of the battery 3 is in the increasing tendency, and proceeds to S14 and resets the increasing counter Nu to 0 (Nu=0) when the determination in S13 is NO, i.e., when the SOC of the battery 3 is in the decreasing tendency.

In S15, the ECU 7 determines whether the increasing counter Nu updated as above is greater than a predetermined second number of times of setting n2. Here, the second number of times of setting n2 is any integer number equal to or larger than 1 and smaller than the first number of times of setting n1. Below, the second number of times of setting n2 is set to 1.

When the determination of S15 is NO, the ECU 7 proceeds to S9 and sets the SOC target value in the degeneration suppression mode subsequent to the previous driving cycle. Besides, when the determination of S15 is YES, i.e., when the SOC of the battery 3 is continuously in the increasing tendency through most recent past driving cycles of the second number of times of setting n2, the ECU 7 proceeds to S7 and sets the SOC target value in the normal mode.

Figure 3:
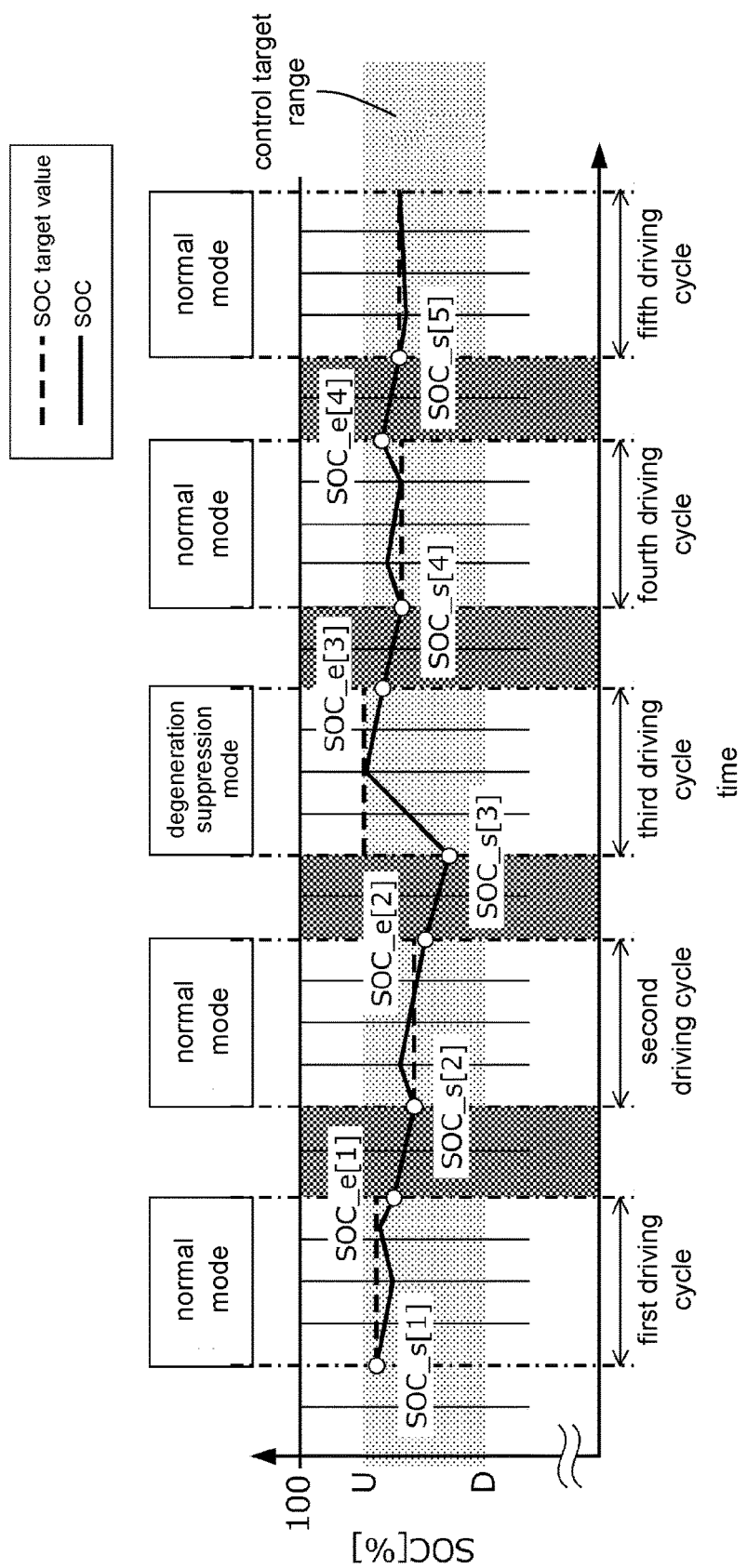
FIG. 3 is a time chart schematically showing the SOC target value in the electric power system and a change of a SOC value of the battery.

FIG. 3 is a time chart schematically showing the SOC target value in the electric power system S and a change of the SOC of the battery 3. In FIG. 3, the change of the SOC of the battery 3 through the first driving cycle to the fifth driving cycle is shown. Besides, in FIG. 3, the change of the SOC of the battery 3 is represented by a bold solid line, and the SOC target value set in each driving cycle by the processes in FIG. 2 is represented by a bold broken line. Besides, in FIG. 3, a situation is shown in which the SOC target values are set in the normal mode in the first, the second, the fourth and the fifth driving cycles, and the SOC target value is set in the degeneration suppression mode in the third driving cycle.

As shown in FIG. 3, in the first and the second driving cycle, the SOC target value is set in the normal mode. Therefore, the SOC target values in the first and the second driving cycle are set to values respectively equal to the starting SOC values (SOC_s [1], and SOC_s [2]) in each driving cycle (see S7 in FIG. 2).

As shown in FIG. 3, in the first and the second driving cycle, the starting SOC values (SOC_s [1] and SOC_s [2]) are greater than the ending SOC values (SOC_e [1] and SOC_e [2]) twice. Therefore, in the processes of FIG. 2 implemented at the start of the third driving cycle, it is determined that the starting SOC value is continuously greater than the ending SOC value through two most recent past driving cycles (see S6 in FIG. 2), and the SOC target value is set in the degeneration suppression mode in the driving cycle after the determination to prevent a further decrease in the SOC (see S9 in FIG. 2). Therefore, in the third driving cycle, the SOC target value is set to the target upper limit U that is greater than the value set in the normal mode (i.e., SOC_s [3]). In this way, by increasing the SOC target value up to the target upper limit U, the battery 3 is actively charged in the third driving cycle, and the SOC of the battery 3 increases up to the vicinity of the target upper limit U. As a result, the ending SOC value (SOC_e [3]) in the third driving cycle is greater than the starting SOC value (SOC_s [3]).

Besides, in the processes of FIG. 2 implemented at the start of the fourth driving cycle, it is determined that the ending SOC value is greater than the starting SOC value in one most recent past driving cycle (see S15 in FIG. 2), and the SOC target value is set in the normal mode in the driving cycles after the determination to suppress the fuel consumption caused by the charge of the battery 3 (see S7 in FIG. 2). Therefore, the SOC target value in the fourth driving cycle is set to a value equal to the starting SOC value (SOC_s [4]) in the fourth driving cycle. Besides, in the fourth driving cycle, the starting SOC value (SOC_s [4]) is lower than the ending SOC value (SOC_e [4]), so that in the fifth driving cycle, the SOC target value is set in the normal mode.

According to the electric power system S of this embodiment, the following effects can be achieved.

(1) By using the starting SOC value which is the value of the charging rate of the battery 3 at the start of the past driving cycle, and the ending SOC value which is the value of the charging rate of the battery 3 at the end of the same driving cycle, the ECU 7 sets the SOC target value for the battery 3 in the present driving cycle, and controls at least one of the charge and discharge of the battery 3 so that the value of the SOC of the battery 3 becomes the SOC target value. In this way, in the electric power system S, the user's tendency of the actual usage of the battery 3 can be grasped with reference to the starting SOC value and the ending SOC value in the past driving cycle, so that the SOC target value can be set to a proper value with which the degeneration of the battery 3 is suppressed according to this usage tendency.

(2) The ECU 7 sets the SOC target value in the normal mode when the starting SOC value is lower than the ending SOC value, and sets the SOC target value in the degeneration suppression mode when the starting SOC value is greater than the ending SOC value so as to be a value greater than the value set in the normal mode. In this way, when the starting SOC value is greater than the stop SOC value, that is, when the SOC of the battery 3 is in the decreasing tendency, the SOC target value is set to a value greater than the situation when the SOC is in an increasing tendency. In the case of using the lead battery as the battery 3, the degeneration process may be expedited when the battery 3 is used or placed in a state with low SOC. In view of this, in the electric power system S, by increasing the SOC target value up to the target upper limit U in the degeneration suppression mode when the SOC of the battery 3 is in the decreasing tendency, the battery 3 can be prevented from being used in a state with low SOC, so that the degeneration of the battery 3 can be suppressed.

(3) When it is determined that the starting SOC value is greater than the ending SOC value continuously for or through more than the first number of times of setting n1 in the past driving cycle in which the SOC target value is set in the normal mode, the ECU 7 determines that the SOC is in the decreasing tendency and increases the SOC target value up to the target upper limit U in the degeneration suppression mode in the driving cycle after the determination. As a result, the mode can be shifted from the normal mode to the degeneration suppression mode at proper timing, and the SOC target value can be increased up to the target upper limit U.

(4) When it is determined that the starting SOC value is continuously lower than the ending SOC value for or more than the second number of times of setting n2 in the past driving cycle in which the SOC target value is set in the degeneration suppression mode, the ECU 7 determines that the decrease in the SOC is dissolved, shifts the mode from the degeneration suppression mode to the normal mode in the driving cycle after the determination and sets the SOC target value. As a result, the mode can be shifted from the degeneration suppression mode to the normal mode at proper timing, and the SOC target value can be decreased from the target upper limit U.

(5) In the electric power system S, the first number of times of setting n1 is greater than the second number of times of setting n2. As a result, the SOC target value can be prevented from being frequently increased up to the target upper limit U in the degeneration suppression mode, so that the fuel consumption for driving the ACG 2 can be suppressed accordingly.

(6) In the electric power system S, the second number of times of setting is set to one. As a result, the duration in which the degeneration suppression mode is continuously implemented, i.e., the duration in which the SOC target value is continuously increased up to the target upper limit U can be shortened, so that the fuel consumption for driving the ACG 2 can be suppressed accordingly.

In the above, the embodiment of the disclosure is described, but the disclosure is not limited to this. Detailed configuration may be properly modified within the scope of the spirit of the disclosure.

For example, in the above embodiment, the situation is described in which the SOC [%] of the battery 3 is focused on as an example of the battery parameter related to the properties of the battery 3, and a target value is set for the SOC, but the disclosure is not limited to this. As the battery parameters related to the properties of the battery 3, there is an output voltage [V] of the battery 3 or an electric power amount [Wh] possible to be output, etc. besides the SOC, and the target value may also be set for these parameters.

GENERAL DESCRIPTION OF SOLUTIONS (1) The electric power system (for example, an electric power system S described above) comprises a battery (for example, a battery 3 described above), connected to an electric device (for example, an ACG 2, a first electric load 51, a second electric load 52, a DCDC converter 6, which are described above, etc.); a target value setting part (for example, an ECU 7 described above), setting target values of battery parameters that are related to properties of the battery; and a charge-discharge control part (for example, the ECU 7 described above), controlling at least one of charge and discharge of the battery so that values of the battery parameters become the target values during at least a portion of an operation cycle (for example, a driving cycle described above) from an operation start to an operation stop of a predetermined device (for example, a vehicle V described above) having the electric device. The target value setting part sets the target value (for example, a SOC target value described above) based on an operation start parameter value (for example, a starting SOC value described above) and an operation end parameter value (for example, an ending SOC value described above). The operation start parameter value is a value of a battery parameter (for example, the SOC of the battery 3, an output voltage [V], and an electric power amount possible to be output [Wh], which are described above) at the start of a past operation cycle, and the operation end parameter value is a value of the battery parameter at the end of the same operation cycle.

(2) In one embodiment, the target value setting part can set the target value to a first value (for example, a value set in a normal mode of S7 in FIG. 2 described above) when the operation start parameter value is lower than the operation end parameter value (for example, a situation described above when a determination of S3 in FIG. 2 is NO), and sets the target value to a second value (for example, a value set in a degeneration suppression mode of S9 in FIG. 2 described above) that is greater than the first value when the operation start parameter value is greater than the operation end parameter value (for example, a situation described above when the determination of S3 in FIG. 2 is YES).

(3) In one embodiment, in a case of making a determination that the operation start parameter value is greater than the operation end parameter value (for example, when the determination of S6 in FIG. 2 described above is YES) for or more than a predetermined first number of times of setting (for example, a first number of times of setting n1 described above) with regard to the past operation cycle in which the target value is set to the first value, the target value setting part can set the target value of an operation cycle that is performed after the determination to the second value.

(4) In one embodiment, in a case of making a determination that the operation start parameter value is greater than the operation end parameter value continuously for or more than the first number of times of setting with regard to the past operation cycle in which the target value is set to the first value, the target value setting part can set the target value of an operation cycle that is performed after the determination to the second value.

(5) In one embodiment, in a case of making a determination that the operation start parameter value is lower than the operation end parameter value (for example, the determination of S15 in FIG. 2 described above is YES) for or more than a predetermined second number of times of setting (for example, a second number of times of setting n2 described above) with regard to the past operation cycle in which the target value is set to the second value, the target value setting part can set the target value of an operation cycle that is performed after the determination to a value lower than the second value.

(6) In one embodiment, in a case of making a determination that the operation start parameter value is lower than the operation end parameter value continuously for or more than the second number of times of setting with regard to the past operation cycle in which the target value is set to the second value, the target value setting part can set the target value of an operation cycle that is performed after the determination to a value lower than the second value.

(7) In one embodiment, in a case of making a determination that the operation start parameter value is greater than the operation end parameter value for or more than a predetermined first number of times of setting in the past operation cycle in which the target value is set to the first value, the target value setting part can set the target value of an operation cycle that is performed after the determination to the second value. Moreover, in a case of making a determination that the operation start parameter value is lower than the operation end parameter value for or more than a predetermined second number of times of setting when it is determined in the past operation cycle in which the target value is set to the second value, the target value setting part can set the target value of an operation cycle that is performed after the determination to a value lower than the second value. In the above case, the first number of times of setting can be greater than the second number of times of setting.

(8) In one embodiment, the second number of times of setting can be one.

(9) In one embodiment, the predetermined device can be a vehicle.

Effects (1) In the electric power system of the disclosure, the target value setting part sets the target value for the present battery parameter by using the operation start parameter value which is the value of the battery parameter at the start of a past operation cycle, and on the operation end parameter value which is the value of the battery parameter at the end of the same operation cycle, and the charge-discharge control part controls at least one of the charge and discharge of the battery so that the value of the battery parameter becomes the target value. In this way, according to the disclosure, because the user's tendency of actual usage of the battery can be grasped with reference to the past operation start parameter value and the operation end parameter value, the target value can be set, according to this usage tendency, to a proper value with which the degeneration of the battery is suppressed.

(2) The target value setting part of the disclosure sets the target value to the first value when the operation start parameter value is above the operation end parameter value, and sets the target value to second value greater than the first value when the operation start parameter value is greater than the operation end parameter value. In this way, when the operation start parameter value is greater than the operation stop parameter value, that is, when the value of the battery parameter is in a decreasing tendency, the target value is set to a value greater than the situation when the value of the battery parameter is in an increasing tendency. There are batteries of which a degeneration process is expedited when being used or placed in a state in which the value of the battery parameter is low. In view of this, in the disclosure, by setting the target value to a greater value when the value of the battery parameter is in a decreasing tendency, the battery can be prevented from being used in a state in which the value of the battery parameter is low, therefore, even when the battery with the degeneration property as mentioned above is used, the degeneration can be suppressed.

(3) In the case of making the determination that the operation start parameter value is greater than the operation end parameter value for or more than the predetermined first number of times of setting in the past operation cycle in which the target value is set to the first value, the target value setting part of the disclosure determines that the value of the battery parameter is in the decreasing tendency, and sets the target value of the operation cycle that is performed after the determination to the second value greater than the first value. As a result, the target value can be increased from the first value to the second value at proper timing.

(4) In the case of making the determination that the operation start parameter value is greater than the operation end parameter value continuously for or more than the first number of times of setting in the past operation cycle in which the target value is set to the first value, the target value setting part of the disclosure determines that the value of the battery parameter is in the decreasing tendency, and sets the target value of the operation cycle that is performed after the determination to the second value greater than the first value. As a result, the target value can be increased from the first value to the second value at proper timing.

(5) In the case of making the determination that the operation start parameter value is lower than the operation end parameter value for or more than the predetermined second number of times of setting in the past operation cycle in which the target value is set to the second value, the target value setting part of the disclosure determines that the decrease in the value of the battery parameter is dissolved, and sets the target value of the operation cycle that is performed after the determination to a value lower than the second value. As a result, the target value can be decreased from the second value at proper timing.

(6) In the case of making the determination that the operation start parameter value is lower than the operation end parameter value continuously for or more than the second number of times of setting in the past operation cycle in which the target value is set the second value, the target value setting part of the disclosure determines that the decrease in the value of the battery parameter is dissolved, and sets the target value of the operation cycle that is performed after the determination to a value lower than the second value. As a result, the target value can be decreased from the second value at proper timing.

(7) In the electric power system of the disclosure, the first number of times of setting is greater than the second number of times of setting. As a result, the target value can be prevented from being frequently changed to a greater value, therefore energy consumption for charging the battery can be suppressed accordingly.

(8) In the electric power system of the disclosure, the second number of times of setting is one. As a result, a duration in which the target value is continuously set to a great value can be shortened, therefore the energy consumption for charging the battery can be suppressed accordingly.

(9) In the electric power system of the disclosure, the predetermined device is a vehicle. In the electric power system of the disclosure, because the user's tendency of actual usage of the battery can be grasped with reference to the operation start parameter value and the operation end parameter value in the operation cycle (i.e., the driving cycle) from the operation start to the operation stop of the vehicle, the target value can be set, according to the usage tendency, to a proper value with which the degeneration of the battery is suppressed.

What is claimed is:

1. An electric power system, comprising:
a battery, connected to an electric device;
a target value setting part, setting a target value for a battery parameter related to properties of the battery; and
a charge-discharge control part, controlling at least one of charge and discharge of the battery so that a value of the battery parameter becomes the target value, during at least a portion of an operation cycle of a predetermined device having the electric device from an operation start to an operation stop, wherein the target value setting part sets the target value based on an operation start parameter value and an operation end parameter value, and the operation start parameter value is a value of the battery parameter at the start of a past operation cycle, and the operation end parameter value is a value of the battery parameter at the end of the same operation cycle.

2. The electric power system according to claim 1, wherein the target value setting part sets the target value to a first value when the operation start parameter value is lower than the operation end parameter value, and sets the target value to a second value that is greater than the first value when the operation start parameter value is greater than the operation end parameter value.

3. The electric power system according to claim 2, wherein in a case of making a determination that the operation start parameter value is greater than the operation end parameter value for or more than a predetermined first number of times of setting with regard to the past operation cycle in which the target value is set to the first value, the target value setting part sets the target value of an operation cycle that is performed after the determination to a second value.

4. The electric power system according to claim 3, wherein in a case of making a determination that the operation start parameter value is greater than the operation end parameter value continuously for or more than the first number of times of setting with regard to the past operation cycle in which the target value is set to the first value, the target value setting part set the target value of an operation cycle that is performed after the determination to the second value.

5. The electric power system according to claim 2, wherein in a case of making a determination that the operation start parameter value is lower than the operation end parameter value for or more than a predetermined second number of times of setting with regard to the past operation cycle in which the target value is set to the second value, the target value setting part sets the target value of an operation cycle that is performed after the determination to a value lower than the second value.

6. The electric power system according to claim 5, wherein in a case of making a determination that the operation start parameter value is lower than the operation end parameter value continuously for or more than the second number of times of setting with regard to the past operation cycle in which the target value is set to the second value, the target value setting part sets the target value of an operation cycle that is performed after the determination to a value lower than the second value.

7. The electric power system according to claim 2, wherein in a case of making a determination that the operation start parameter value is greater than the operation end parameter value for or over a predetermined first number of times of setting with regard to the past operation cycle in which the target value is set to the first value, the target value setting part sets the target value of an operation cycle that is performed after the determination to a second value, in a case of making a determination that the operation start parameter value is lower than the operation end parameter value for or more than a predetermined second number of times of setting with regard to the past operation cycle in which the target value is set to the second value, the target value setting part sets the target value of an operation cycle that is performed after the determination to a value lower than the second value, and the first number of times of setting is greater than the second number of times of setting.

8. The electric power system according to claim 7, wherein the second number of times of setting is one.

9. The electric power system according to claim 1, wherein the predetermined device is a vehicle.

10. The electric power system according to claim 3, wherein in a case of making a determination that the operation start parameter value is lower than the operation end parameter value for or more than a predetermined second number of times of setting with regard to the past operation cycle in which the target value is set to the second value, the target value setting part sets the target value of an operation cycle that is performed after the determination to a value lower than the second value.

11. The electric power system according to claim 4, wherein in a case of making a determination that the operation start parameter value is lower than the operation end parameter value for or more than a predetermined second number of times of setting with regard to the past operation cycle in which the target value is set to the second value, the target value setting part sets the target value of an operation cycle that is performed after the determination to a value lower than the second value.

12. The electric power system according to claim 10, wherein in a case of making a determination that the operation start parameter value is lower than the operation end parameter value continuously for or more than the second number of times of setting with regard to the past operation cycle in which the target value is set to the second value, the target value setting part sets the target value of an operation cycle that is performed after the determination to a value lower than the second value.

13. The electric power system according to claim 11, wherein in a case of making a determination that the operation start parameter value is lower than the operation end parameter value continuously for or more than the second number of times of setting with regard to the past operation cycle in which the target value is set to the second value, the target value setting part sets the target value of an operation cycle that is performed after the determination to a value lower than the second value.

14. The electric power system according to claim 5, wherein the second number of times of setting is one.

15. The electric power system according to claim 10, wherein the second number of times of setting is one.

16. The electric power system according to claim 11, wherein the second number of times of setting is one.

17. The electric power system according to claim 6, wherein the second number of times of setting is one.

18. The electric power system according to claim 12, wherein the second number of times of setting is one.

19. The electric power system according to claim 13, wherein the second number of times of setting is one.

* * * * *